(12) United States Patent
Kondo et al.

(10) Patent No.: US 11,157,344 B2
(45) Date of Patent: Oct. 26, 2021

(54) FAILURE INFORMATION SHARING SYSTEM

(71) Applicant: FUJI CORPORATION, Chiryu (JP)

(72) Inventors: Hironori Kondo, Toyohashi (JP); Shingo Kokawa, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 141 days.

(21) Appl. No.: 16/487,872

(22) PCT Filed: Feb. 24, 2017

(86) PCT No.: PCT/JP2017/007047
§ 371 (c)(1),
(2) Date: Aug. 22, 2019

(87) PCT Pub. No.: WO2018/154701
PCT Pub. Date: Aug. 30, 2018

(65) Prior Publication Data
US 2020/0241952 A1    Jul. 30, 2020

(51) Int. Cl.
| | |
|---|---|
| *G06F 11/00* | (2006.01) |
| *G06F 11/07* | (2006.01) |
| *G05B 19/418* | (2006.01) |
| *G06Q 10/06* | (2012.01) |
| *G06Q 50/04* | (2012.01) |
| *G07C 3/00* | (2006.01) |
| *G07C 3/14* | (2006.01) |
| *G06F 8/65* | (2018.01) |

(52) U.S. Cl.
CPC .... *G06F 11/0784* (2013.01); *G05B 19/41875* (2013.01); *G06F 11/0721* (2013.01);
(Continued)

(58) Field of Classification Search
CPC .......... G06F 11/0784; G06F 11/0721; G05B 19/41875; G06Q 10/06395; G07C 3/005; G07C 3/146
See application file for complete search history.

(56) References Cited

U.S. PATENT DOCUMENTS 6,801,822 B1 * 10/2004 Fujiwara .......... G05B 19/41875
                                                               700/108
7,007,038 B1 * 2/2006 Kazemi .................. G06Q 10/06
(Continued)

FOREIGN PATENT DOCUMENTS

EP       1 852 556 A1    11/2007
JP    2003-108219 A       4/2003
(Continued)

OTHER PUBLICATIONS

International Search Report dated Apr. 11, 2017 in PCT/JP2017/007047 filed on Feb. 24, 2017.
(Continued)

*Primary Examiner* — Philip Guyton
(74) *Attorney, Agent, or Firm* — Oblon, McClelland, Maier & Neustadt, L.L.P.

(57) ABSTRACT

Multiple component mounters that configure multiple user-side component mounting lines and a support-side information server are connected so as to be able to communicate with each other via a network. The support-side information server includes an information registration section collecting and registering failure information generated in the multiple user-side production devices and updating and registering failure avoidance information as a failure avoidance method becomes apparent, and an information distribution section distributing the failure information and the failure avoidance information to the user-side production devices. Each user-side production device includes an information receiving section receiving the failure information and the failure avoidance information from the support-side information server, and an information transmitting section transmitting to a user-side production manager the failure information and the failure avoidance information related to a failure that may occur at a production device managed by the production manager.

15 Claims, 3 Drawing Sheets

(52) U.S. Cl.
CPC ....... *G06Q 10/06395* (2013.01); *G06Q 50/04* (2013.01); *G07C 3/005* (2013.01); *G07C 3/146* (2013.01); *G05B 2219/32368* (2013.01); *G06F 8/65* (2013.01)

(56) References Cited

U.S. PATENT DOCUMENTS

| | | | |
|---|---|---|---|
| 7,047,100 B2* | 5/2006 | Kitamoto | G05B 19/4184 |
| | | | 700/121 |
| 7,805,279 B2* | 9/2010 | Ogushi | G03F 7/70525 |
| | | | 702/184 |
| 9,256,221 B2* | 2/2016 | Araki | G05B 19/4184 |
| 2003/0065679 A1* | 4/2003 | Hirayama | G05B 19/4184 |
| 2004/0176868 A1* | 9/2004 | Haga | G05B 19/4184 |
| | | | 700/121 |
| 2007/0174654 A1 | 7/2007 | Berman et al. | |
| 2008/0140435 A1 | 6/2008 | Arakawa | |
| 2008/0163374 A1 | 7/2008 | Rogers | |
| 2009/0070634 A1 | 3/2009 | Stephan | |

FOREIGN PATENT DOCUMENTS

| | | |
|---|---|---|
| JP | 2004-220324 A | 8/2004 |
| JP | 2010-515177 A | 5/2010 |
| WO | WO 2014/097377 A1 | 6/2014 |

OTHER PUBLICATIONS

Extended European Search Report dated Dec. 16, 2019 in Patent Application No. 17897716.1, 9 pages.

* cited by examiner

FAILURE INFORMATION SHARING SYSTEM

The present specification discloses technology related to a failure information sharing system in which multiple user-side production devices or production management devices of a production line and a support-side information server configured for supporting the user-side devices are connected so as to be able to communicate with each other via a network.

BACKGROUND ART

For example, when some kind of failure occurs during production using a production device such as a component mounter or a machine tool, the production stops or defective products are produced, therefore, preventing the occurrence of failures during production leads to improvement in productivity and quality. From such a viewpoint, a company manufacturing and selling a production device collects information on failures that have occurred in the production device on the user side by telephone, e-mail, or the like from the user, and publishes collected failure information and information on a method for avoiding the failure as needed in a support column of its own website on the internet in order to disclose the information to the user (see, for example, patent literature 1).

CITATION LIST

Patent Literature

Patent literature 1: JP-A-2004-220324

SUMMARY

However, until a user accesses a website on the internet and browses to a support column or the like to find out failure information, the user continues production without knowing the contents of the failure, and the same failure as the failure posted on the website may occur, stopping production or leading to a defective product or a low-quality product being produced. That is, in a conventional method, there tends to be a delay in informing the user of failure information posted on the website, and this leads to a deterioration in productivity and a deterioration in quality.

To solve the above problems, disclosed herein is a failure information sharing system including: multiple user-side production devices; and a support-side information server configured for supporting the user-side production devices, the user-side production devices and the support-side information server being connected so as to be able to communicate with each other via a network, wherein the support-side information server includes an information registration section configured to collect and register failure information generated in the multiple user-side production devices and update and register failure avoidance information as a failure avoidance method becomes apparent on the support side, and an information distribution section configured to distribute the failure information and the failure avoidance information to the multiple user-side production devices periodically or each time the registration information is updated, and each of the multiple user-side production devices includes an information receiving section configured to receive the failure information and the failure avoidance information from the support-side information server periodically or each time the registration information is updated, and an information transmitting section configured to transmit to a user-side production manager the failure information and the failure avoidance information related to, among the failure information and the failure avoidance information received by the information receiving section, a failure that may occur at at least a production device managed by the production manager. Here, the support-side means a firm that manufactures, sells, or maintains a production device, the firm being the main entity that provides failure information of the production devices to the user side.

With this configuration, the failure information and the failure avoidance information registered in the support-side information server are distributed to the user-side production device periodically or every time the registration information is updated, and the user-side production device transmits to a user-side production manager the failure information and the failure avoidance information related to, among the failure information and the failure avoidance information received by the information receiving section, a failure that may occur at at least a production device managed by the production manager, therefore, the user-side production manager is able to know promptly the failure information and the failure avoidance information related to a failure that may occur at a production device managed by the production manager, so is able to quickly perform countermeasures to avoid the failure based on the failure information and the failure avoidance information.

In this case, the transmission of the failure information and the failure avoidance information received by the user-side production device to the production manager may use, for example, at least one of display, audio, or transmission to a mobile terminal.

Further, the failure information may include information on the operation contents of the user, the production conditions, or the configuration of the production device at which the failure occurred. This makes it easier to determine whether there is a possibility that a failure similar to the failure information received by the user-side production device may occur in given a production device.

Further, the failure information generated in the user-side production device may be communicated to the support side by the user by telephone, e-mail, writing to the failure report column of an internet home page, or the like, or each of the user-side production devices may be configured to have a failure information transmitting section for transmitting the failure information to the support-side information server when the failure occurs in the user-side production device. By doing so, it is possible to reliably and automatically register the failure information generated in the user-side production device in the support-side information server.

In this case, each of the user-side production devices may ask the user-side production manager whether to transmit failure information to the support-side information server when a failure occurs in their own production device, and transmit the failure information that the user-side production manager has asked to receive from the failure information transmitting section to the support-side information server. This is because, depending on the user, there is a possibility that there is failure information that the user does not want to disclose to a third party.

Alternatively, each of the multiple user-side production devices may include a transmission information selecting section configured to allow the user-side production manager to select in advance a type of failure to be transmitted to the support-side information server, such that, when the failure occurs in their own production device, the failure information is transmitted to the support-side information server if the failure is the type of failure selected by the user-side production manager.

Further, the support-side information server may be configured to register the failure information and the failure avoidance information in the information registration section with an urgency level indicating a degree of urgency of countermeasures against the failure with respect to the multiple user-sides, and distribute the failure information and the failure avoidance information from the information distribution section to the multiple user-side production devices with the urgency level. This makes it easier for the user-side production manager to determine when to perform measures to avoid the failure received from the support-side information server.

Further, each of the multiple user-side production devices may include a failure avoidance measure executing section configured to interpret the failure information and the failure avoidance information received from the support-side information server and execute failure avoidance measures for avoiding the failure. By doing so, it is possible to automatically perform measures for avoiding a failure that may occur in the user-side production device.

Further, each of the multiple user-side production devices may be configured such that, when the information receiving section receives the failure information from the support-side information server, the failure avoidance measure executing section determines whether a production job or a configuration of its own production device is shared with the production job or a configuration of the production device for which the failure occurred, and if determining that it is shared, promptly causes its own production device to stop as the failure avoidance countermeasure, and transmits a notice of this to the user-side production manager.

In this case, each of the multiple user-side production devices may include a failure avoidance measure selecting section configured to allow the user-side production manager to select in advance contents of failure avoidance measures to be executed by the failure avoidance measure executing section in accordance with the degree of urgency for dealing with the failure.

Here, the failure avoidance measures selectable using the failure avoidance measure selecting section may be any one of a production stop, a change in a production condition, a warning, and a software update (a regular update, installation of a failure avoidance program, or the like), and the user-side production manager may select the failure avoidance measures in consideration of the urgency level of the countermeasures for the failure.

Instead of a configuration in which user-side production devices and a supply-side information server are connected by a network, a configuration in which production management devices of multiple user-side production lines and a supply-side information server are connected by a network may be employed. In this case, the support-side information server may include an information registration section configured to collect and register failure information generated in the multiple user-side production devices and update and register failure avoidance information as a failure avoidance method becomes apparent on the support side, and an information distribution section configured to distribute the failure information and the failure avoidance information to the multiple user-side production devices periodically or each time the registration information is updated, and each of the multiple user-side production devices may include an information receiving section configured to receive the failure information and the failure avoidance information from the support-side information server periodically or each time the registration information is updated, and an information transmitting section configured to transmit to a user-side production manager the failure information and the failure avoidance information related to, among the failure information and the failure avoidance information received by the information receiving section, a failure that may occur at at least any one of the multiple production devices that configure the production line managed by the production manager.

DESCRIPTION OF EMBODIMENTS

A first and a second embodiment are described below.

First Embodiment

Figure 1:
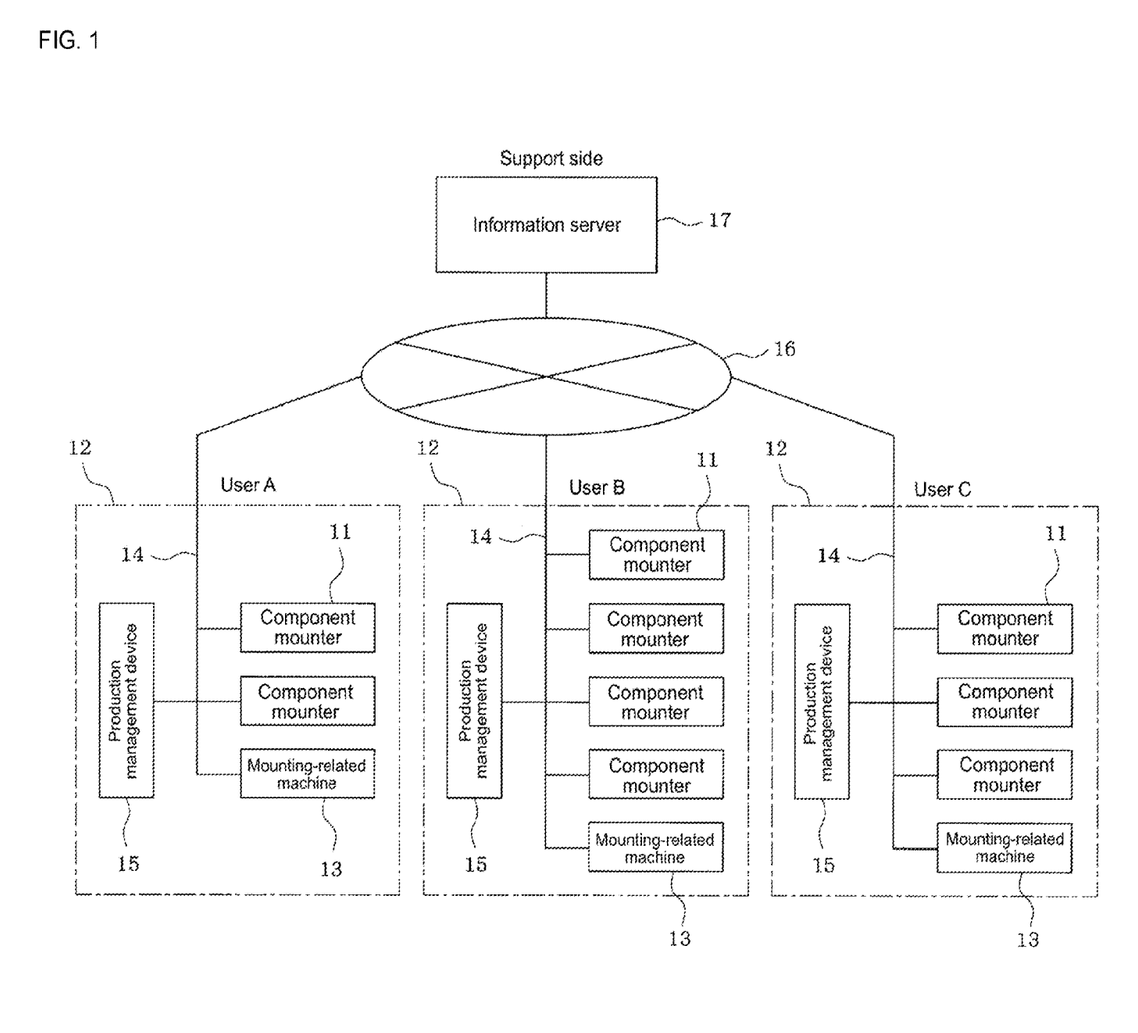
FIG. 1 is a block diagram showing a configuration example of a failure information sharing system according to a first embodiment.

A first embodiment of the present disclosure will be described with reference to FIGS. 1 and 2. First, the overall configuration of the failure information sharing system is described based on FIG. 1.

In the first embodiment, production devices of multiple users, A, B, and C, are component mounters 11, and component mounting line 12 (production line) composed of multiple component mounters 11 is installed in the factory of each of the users A, B, and C. In each component mounting line 12, in addition to the multiple component mounters 11, mounting-related machines 13 (production devices) such as solder printing machines, inspection machines, reflow devices, and the like are arranged.

The multiple component mounters 11 and mounting-related machines 13 constituting the component mounting line 12 are connected so as to be able to communicate with each other via network 14 such as a LAN, and the production operations of component mounters 11 and mounting-related machines 13 are managed by production management device 15.

The component mounters 11 and the mounting-related machines 13 of the multiple users A, B, and C are connected to support-side information server 17 via network 16 such as the internet or a dedicated communication line such that communication is possible. Here, the support-side means a firm that manufactures, sells, or maintains component mounters 11 or mounting related devices 13, the firm being the main entity that provides failure information of the component mounters 11 or mounting related devices 13 to user A, B, and C.

Figure 2:
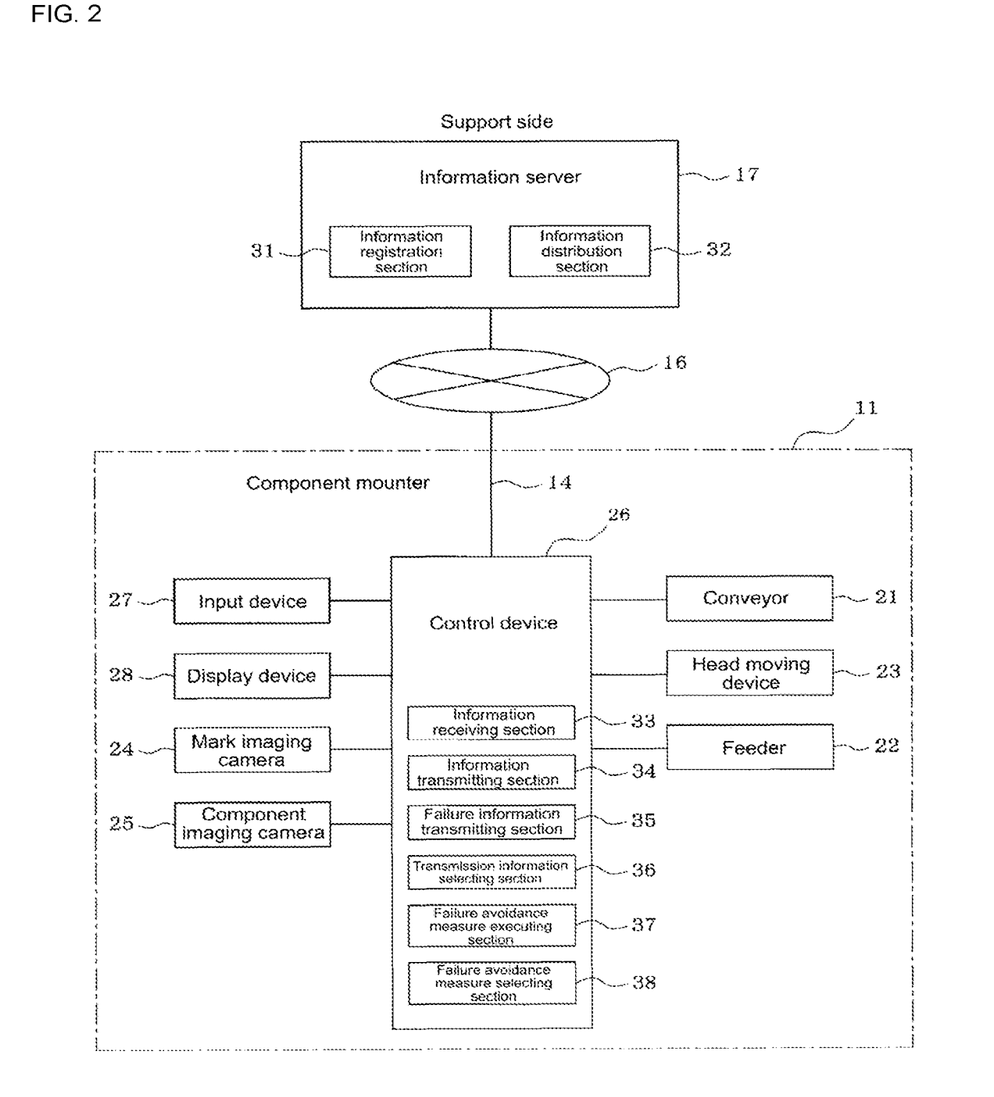
FIG. 2 is a block diagram illustrating functions of main parts of the failure information sharing system according to the first embodiment.

As shown in FIG. 2, component mounter 11 includes conveyor 21 for loading a circuit board, feeders 22 for supplying electronic components, head moving device 23 for moving a mounting head (not shown) that holds a suction nozzle (not shown), mark imaging camera 24 for imaging a reference position mark of the circuit board from above, and component imaging camera 25 for imaging a component held by the suction nozzle from below. Control device 26 of component mounter 11 images the reference position mark of the circuit board loaded by conveyor 21 with mark imaging camera 24, recognizes the reference position of the circuit board by image processing, recognizes the mounting position of the circuit board, picks up the electronic component supplied from feeder 22 with the suction nozzle, moves the electronic component to the imaging position, images the electronic component with component imaging camera 25, measures the amount of deviation of the pickup position of the electronic component by image processing, corrects the amount of deviation of the pickup position of the electronic component, and mounts the electronic component on the mounting position of the circuit board. Input device 27 such as a keyboard, a mouse, or a touchscreen panel, and display device 28 such as a liquid crystal display or a CRT are connected to control device 26 of component mounter 11.

Support-side information server 17 is provided with information registration section 31, and collects the failure information generated in component mounter 11 and mounting-related machine 13 at the multiple users A, B, and C sides, and registers it in information registration section 31, and updates and registers the failure avoidance information in the information registration unit 31 as soon as the method of avoiding the failure is found on the support side. Further, information server 17 also functions as information distribution section 32, and distributes the failure information and the failure avoidance information registered in the information registration section 31 to the component mounters 11 and the mounting-related machines 13 of the multiple users A, B, and C via network 16 periodically or every time the registration information is updated.

When periodically distributing the failure information and the failure avoidance information, distribution may be performed at a point when a predetermined time has elapsed from the previous distribution, a point when power of control device 26 is turned on, a point when production is started, or the like, distribution is not necessarily required to be at a predetermined time interval, so long as it is performed at a predetermined specified point. Further, in the case of distributing the failure information and the failure avoidance information every time the registration information is updated, it may be determined whether to distribute the failure information in accordance with the degree of urgency (urgency level) of countermeasures against the failure, and, for example, it may be distributed every time failure information having a high urgency level is updated and registered.

Here, the failure information includes information on the operation contents of users A, B, or C, the production conditions, or the configuration of the component mounter 11 (or the mounting-related machine 13) at which the failure has occurred. The information on the configuration of the component mounter 11 includes, for example, the type of component mounter 11, the type of a unit used such as feeder 22, the type of the suction nozzle used, the configuration of network 14, and the like. The information on the production conditions includes, for example, a production pattern (head moving speed, coordinate information, etc.), the type of conveyor used (single lane, double lane), and so on. The information of the operation contents of users A, B, and C includes information of the operation contents that caused the occurrence of the failure, and the like. In addition, information on recurrence of a failure, a log file, and the like are also included. The file format of the failure information may be any file format such as text, CSV, or the like.

Further, in the first embodiment, support-side information server 17 is configured to register the failure information and the failure avoidance information in information registration section 31 with an urgency level indicating a degree of urgency of countermeasures against the failure with respect to the multiple user A, B, and C sides, and distribute the failure information and the failure avoidance information from information distribution section 32 to the multiple user A, B, and C-side component mounters 11 and mounting-related machine 13 with the urgency level. This makes it easier for production managers of the users A, B, and C to determine when to perform measures to avoid the failure received from support-side information server 17.

On the other hand, control device 26 of component mounter 11 and the control device (not shown) of mounting-related machine 13 of the multiple users A, B, and C are configured mainly by computers, and function as information receiving section 33 that receives failure information and failure avoidance information distributed from support-side information server 17 periodically or with every registration information update via the networks 16 and 14. Further, control device 26 of component mounter 11 and the control device of mounting-related machine 13 also function as information transmitting section 34 that transmits to the production managers of users A, B, and C. failure information and failure avoidance information regarding a failure that may occur in at least the component mounter 11 or the mounting-related machine 13 managed by the production managers among the failure information and failure avoidance information received by the information receiving section 33.

In this case, information transmitting section 34 may display the failure information and the failure avoidance information on display device 28, transmit the information to the production manager by audio, or transmit an e-mail of the failure information and the failure avoidance information to a mobile terminal (not shown) carried by the production manager.

Further, control section 26 of component mounter 11 and the control section of mounting related device 13 also function as failure information transmitting section 35 that transmits the failure information to support-side information server 17 when a failure occurs in component mounter 11 or the mounting related device 13.

In this case, control device 26 of the part mounting device 11 and the control device of mounting-related machine 13 may ask the production manager of the user A, B, and C by indicating whether to transmit the failure information to support-side information server 17 when a failure occurs in component mounter 11 or the mounting-related machine 13 via display device 28, audio or a mobile terminal, and transmit the failure information that the user-side production manager has asked to receive from failure information transmitting section 35 to support-side information server 17. This is because, depending on the users A, B, and C, there is a possibility that there is failure information that the user does not want to disclose to a third party.

Alternatively, control device 26 of component mounter 11 or the control device of mounting-related machine 13 may include transmission information selecting section 36 configured to allow the user-side production manager to select in advance a type of failure to be transmitted to support-side information server 17, such that, when the failure occurs in their own production device, the failure information is transmitted to support-side information server 17 if the failure is the type of failure selected by the user-side production manager.

For example, when the user A, B, C selects not to transmit failure information regarding an independently added function to support-side information server 17 by operation of the input device 27, transmission information selecting section 36 does not transmit the failure information to support-side information server 17 even if the defect occurs for the function added independently by the user A, B, C, and transmits only the other failure information to support-side information server 17.

Further, in the first embodiment, control device 26 of component mounter 11 and the control device of mounting-related machine 13 are configured to also function as failure avoidance measure executing section 37 that interprets the failure information and the failure avoidance information received from support-side information server 17 and executes failure avoidance measures for avoiding the failure. By doing so, it is possible to automatically perform a measure to avoid a failure that may occur in component mounter 11 or mounting-related machine 13 at the user A, B, and C side.

In this case, control device 26 of component mounter 11 and the control device of mounting-related machine 13 are configured such that, when the information receiving section 33 receives the failure information from support-side information server 17, the failure avoidance measure executing section 37 determines whether a production job or a configuration of its own component mounter 11 or mounting-related machine 13 is shared with the production job or a configuration of the component mounter 11 or mounting-related machine 13 for which the failure occurred, and if determining that it is shared, promptly causes its own component mounter 11 or mounting-related machine 13 to stop as the failure avoidance countermeasure, and transmits a notice of this to the user A, B, or C-side production manager.

Further, control device 26 of component mounter 11 and the control device of mounting-related machine 13 are configured to also function as failure avoidance measure selecting section 38 configured to allow the user-side production manager to operate input device 27 to select in advance contents of failure avoidance measures to be executed by failure avoidance measure executing section 37 in accordance with the degree of urgency for dealing with the failure. Here, when a degree of urgency is assigned to the failure information received by control device 26 of component mounter 11 and the control device of mounting-related machine 13, this degree of urgency may be used as the "degree of urgency of countermeasures against the failure".

In this case, the failure avoidance measures selectable using failure avoidance measure selecting section 38 may be any one of a production stop, a change in a production condition, a warning, and a software update (a regular update, installation of a failure avoidance program, or the like), and the user A, B, or C-side production manager may select the failure avoidance measures in consideration of the urgency level of the countermeasures for the failure (degree of urgency of failure information).

Information receiving section 33, information transmitting section 34, failure information transmitting section 35, transmission information selecting section 36, failure avoidance measure executing section 37, and failure avoidance measure selecting section 38 described above may be configured by either software or hardware, or may be configured by a combination of both.

In the first embodiment described above, the failure information and the failure avoidance information registered in information registration section 31 of support-side information server 17 are distributed to the user A, B, or C-side component mounter 11 or mounting-related machine 13 periodically or every time the registration information is updated, and the user A, B, or C-side component mounter 11 or mounting-related machine 13 transmits to a user A, B, or C-side production manager the failure information and the failure avoidance information related to, among the failure information and the failure avoidance information received by the information receiving section, a failure that may occur at at least a component mounter 11 or mounting-related machine 13 managed by the production manager, therefore, the user A, B, or C-side production manager is able to know promptly the failure information and the failure avoidance information related to a failure that may occur at a component mounter 11 or mounting-related machine 13 managed by the production manager, so is able to quickly perform countermeasures to avoid the failure based on the failure information and the failure avoidance information. As a result, it is possible to prevent a similar failure from occurring with other users, and it is possible to prevent a production stop or a defective product from occurring due to the occurrence of a failure in component mounter 11 or mounting-related machine 13.

Further, in the first embodiment, since failure information transmitting section 35 that transmits failure information to support-side information server 17 when a failure occurs in that component mounter 11 or mounting-related machine 13 is provided in each of component mounter 11 and mounting-related machine 13 of the multiple users A, B, and C, failure information generated in component mounter 11 and mounting-related machine 13 at the user A, B, or C side is be registered in support-side information server 17 reliably and automatically.

However, according to the present disclosure, the failure information generated in component mounter 11 and mounting-related machine 13 of users A, B, and C may be communicated to the support side by user A, B, or C entering the failure information in a failure report column of an internet page, using the telephone, sending e-mail, or the like.

Second Embodiment

Figure 3:
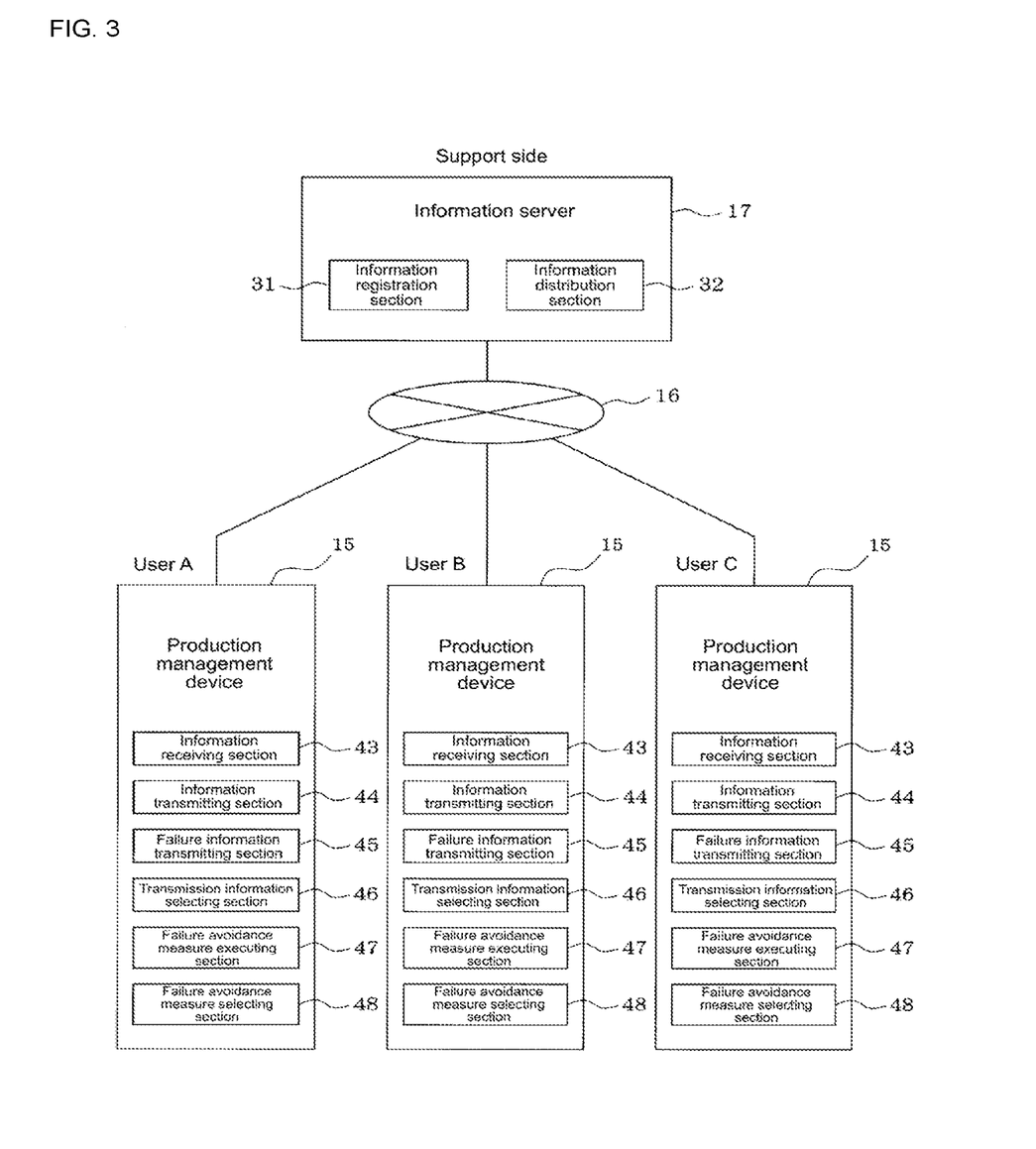
FIG. 3 is a block diagram illustrating functions of main parts of the failure information sharing system according to a second embodiment.

Next, a second embodiment is described using FIG. 3. However, for portions that are effectively the same as in the first embodiment, the same symbols will be assigned and description will be omitted or simplified, and description will mainly be given of different portions.

In the first embodiment, the failure information and the failure avoidance information registered in information registration section 31 of support-side information server 17 are distributed to component mounters 11 and mounting-related machines 13 at the users A, B and C side periodically or every registration information update, but in the second embodiment, the failure information and the failure avoidance information registered in information registration section 31 of support-side information server 17 are distributed to the multiple production management devices 15 of component mounting lines 12 on the user A, B and C sides.

Each of the multiple production management devices 15 of component mounting lines 12 of the users A, B, and C is mainly configured by a computer, and is configured to function as information receiving section 43 for receiving failure information and failure avoidance information distributed from support-side information server 17 periodically or every registration information update, and as information transmitting section 44 for transmitting, among the failure information and failure avoidance information received by the information receiving section 43, failure information and failure avoidance information regarding a defect that may occur in at least one of the multiple component mounters 11 and mounting-related machines 13 that constitute the component mounting line 12 of the user A, B, and C to the production managers of the users A, B, and C. Here, the failure information includes information on the operation contents of the user A, B, or C, the production conditions, the configuration of component mounting line 12, or the configuration of component mounter 11 or mounting-related machine 13 at which the failure occurred. The information of the configuration of component mounting line 12 includes information indicating the arrangement order of the multiple component mounters 11 and the mounting-related machines 13 that constitute the component mounting line 12.

Further, similarly to the first embodiment, each of the multiple production management devices 15 of component mounting lines 12 of users A, B, and C is configured to also function as failure information transmitting section 45, transmission information selection section 46, failure avoidance measure executing section 47, and failure avoidance measure selection section 48, and the same measures as that of the first embodiment are performed through production management device 15. With the second embodiment described above, it is possible to obtain the same effects as the first embodiment.

A production line to which the present disclosure can be applied is not limited to a component mounting line, and may be a production line in which production devices other than a component mounter, for example, a machine tool, are arranged, and the present disclosure can be implemented by various modifications within a scope not deviating from the gist.

REFERENCE SIGNS LIST

11: component mounter (production device);
12: component mounting line (production line);
13: mounting-related machines (production devices);
14: network;
15: production management device;
16: network;
17: information server;
26: control device of component mounter;
27: input device;
28: display device;
31: information registration section;
32: information distribution section;
33: information receiving unit section;
34: information transmitting section;
35: failure information transmitting section;
36: transmission information selecting section;
37: failure avoidance measure executing section;
38: failure avoidance measure selecting section;
43: information receiving section;
44: information transmitting section;
45: failure information transmitting section;
46: transmission information selecting section;
47: failure avoidance measure executing section;
48: failure avoidance measure selecting section

The invention claimed is:

1. A failure information sharing system comprising:
multiple user-side production devices; and
a support-side information server configured for supporting the user-side production devices, the user-side production devices and the support-side information server being connected so as to be able to communicate with each other via a network,
wherein
the support-side information server includes
    an information registration section configured to collect and register failure information generated in the multiple user-side production devices and update and register failure avoidance information as a failure avoidance method becomes apparent on the support side, the failure information and the failure avoidance information including an urgency level indicating a degree of urgency of countermeasures against the failure with respect to the multiple user-side production devices, and
    an information distribution section configured to distribute the failure information and the failure avoidance information to the multiple user-side production devices when the registration information is updated and the urgency level is greater than a predetermined threshold, and
each of the multiple user-side production devices includes
    an information receiving section configured to receive the failure information and the failure avoidance information from the support-side information server, and
    an information transmitting section configured to transmit to a user-side production manager the failure information and the failure avoidance information related to, among the failure information and the failure avoidance information received by the information receiving section, a failure that may occur at at least a production device managed by the production manager.

2. The failure information sharing system according to claim 1, wherein
the information transmitting section is configured to transmit the failure information and the failure avoidance information to the user-side production manager by at least one of display, audio, or transmission to a mobile terminal.

3. The failure information sharing system according to claim 1, wherein
the failure information includes information on operation contents of the user, production conditions, or a configuration of a production device at which the failure occurred.

4. The failure information sharing system according to claim 1, wherein
each of the multiple user-side production devices includes a failure information transmitting section configured to transmit failure information to the support-side information server when a failure occurs in their own production device.

5. The failure information sharing system according to claim 4, wherein
each of the multiple user-side production devices is configured to ask the user-side production manager whether to transmit failure information to the support-side information server when a failure occurs in their own production device, and transmit the failure information that the user-side production manager has asked to receive from the failure information transmitting section to the support-side information server.

6. The failure information sharing system according to claim 4, wherein
each of the multiple user-side production devices includes a transmission information selecting section configured to allow the user-side production manager to select in advance a type of failure to be transmitted to the support-side information server, such that, when the failure occurs in their own production device, the failure information is transmitted to the support-side information server if the failure is the type of failure selected by the user-side production manager.

7. The failure information sharing system according to claim 1, wherein
each of the multiple user-side production devices includes a failure avoidance measure executing section configured to interpret the failure information and the failure avoidance information received from the support-side information server and execute failure avoidance measures for avoiding the failure.

8. The failure information sharing system according to claim 7, wherein
each of the multiple user-side production devices is configured such that, when the information receiving section receives the failure information from the support-side information server, the failure avoidance measure executing section determines whether a production job or a configuration of its own production device is shared with the production job or a configuration of the production device for which the failure occurred, and if determining that it is shared, promptly causes its own production device to stop as the failure avoidance countermeasure, and transmits a notice of this to the user-side production manager.

9. The failure information sharing system according to claim 7, wherein
each of the multiple user-side production devices includes a failure avoidance measure selecting section configured to allow the user-side production manager to select in advance contents of failure avoidance measures to be executed by the failure avoidance measure executing section in accordance with the degree of urgency for dealing with the failure.

10. The failure information sharing system according to claim 9, wherein
the failure avoidance measure selectable using the failure avoidance measure selecting section is any one of a production stop, a change in a production condition, a warning, and a software update.

11. The failure information sharing system according to claim 1, wherein
the production device is each of multiple devices constituting a production line.

12. The failure information sharing system according to claim 11, wherein
the production device is a component mounter.

13. A failure information sharing system comprising:
multiple user-side production management devices of a production line; and
a support-side information server configured for supporting the user-side production management devices, the user-side production devices and the support-side information server being connected so as to be able to communicate with each other via a network,
wherein
the support-side information server includes
an information registration section configured to collect and register failure information generated in the multiple user-side production devices and update and register failure avoidance information as a failure avoidance method becomes apparent on the support side, the failure information and the failure avoidance information including an urgency level indicating a degree of urgency of countermeasures against the failure with respect to the multiple user-side production devices, and
an information distribution section configured to distribute the failure information and the failure avoidance information to the multiple user-side production devices when the registration information is updated and the urgency level is greater than a predetermined threshold, and
each of the multiple user-side production devices includes
an information receiving section configured to receive the failure information and the failure avoidance information from the support-side information server, and
an information transmitting section configured to transmit to a user-side production manager the failure information and the failure avoidance information related to, among the failure information and the failure avoidance information received by the information receiving section, a failure that may occur at at least any one of the multiple production devices that configure the production line managed by the production manager.

14. The failure information sharing system according to claim 13, wherein
the failure information includes information on operation contents of the user, production conditions, or a configuration of a production device at which the failure occurred.

15. The failure information sharing system according to claim 13, wherein
the production line is a component mounting line and the production device is a component mounter.

\* \* \* \* \*